US006889863B2

(12) United States Patent
Feigel et al.

(10) Patent No.: US 6,889,863 B2
(45) Date of Patent: May 10, 2005

(54) COMPENSATION RESERVOIR COMPRISING A RADIAL AIR DUCT ARRANGED IN THE COVER

(75) Inventors: Hans-Jörg Feigel, Rosbach (DE); Peter Tandler, Kronberg/Ts (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/380,888

(22) PCT Filed: Sep. 12, 2001

(86) PCT No.: PCT/EP01/10510

§ 371 (c)(1),
(2), (4) Date: Mar. 20, 2003

(87) PCT Pub. No.: WO02/24502

PCT Pub. Date: Mar. 28, 2002

(65) Prior Publication Data

US 2004/0011793 A1 Jan. 22, 2004

(30) Foreign Application Priority Data

Sep. 25, 2000 (DE) .......................................... 100 47 328

(51) Int. Cl.[7] .............................................. B65D 51/16
(52) U.S. Cl. ...................................... 220/303; 215/307
(58) Field of Search ............................. 220/303, 366.1, 220/367.1, 368, 374, 785; 215/307, 310

(56) References Cited

U.S. PATENT DOCUMENTS

| | | | | |
|---|---|---|---|---|
| 3,589,545 A | * | 6/1971 | Carpenter et al. .......... | 215/260 |
| 3,804,284 A | * | 4/1974 | Moore et al. ................ | 215/272 |
| 4,163,500 A | * | 8/1979 | Gunne et al. ................ | 215/260 |
| 4,915,250 A | * | 4/1990 | Hayes, Jr. .................... | 220/711 |
| 4,922,954 A | * | 5/1990 | Blomquist et al. .......... | 137/493 |
| 4,956,156 A | * | 9/1990 | Kanner et al. .............. | 422/300 |
| 5,005,717 A | * | 4/1991 | Oilar .......................... | 215/13.1 |
| 5,579,936 A | * | 12/1996 | Costa et al. ................. | 215/261 |
| 5,779,082 A | * | 7/1998 | Miramon ..................... | 220/212 |
| 5,803,286 A | * | 9/1998 | Pfefferkorn et al. ........ | 215/307 |
| 5,944,211 A | * | 8/1999 | Woodnorth et al. .... | 220/203.13 |
| 5,989,608 A | * | 11/1999 | Mizuno ....................... | 426/113 |
| 6,202,871 B1 | * | 3/2001 | Kelly .......................... | 215/307 |
| 6,604,643 B1 | * | 8/2003 | Michael et al. ............. | 215/204 |

FOREIGN PATENT DOCUMENTS

| | | |
|---|---|---|
| DE | 25 58 824 | 7/1977 |
| DE | 37 34 421 A1 | 4/1989 |
| DE | 297 04 050 U1 | 8/1998 |
| GB | 2 115 528 A | 9/1983 |

* cited by examiner

*Primary Examiner*—Lien M. Ngo
(74) *Attorney, Agent, or Firm*—RatnerPrestia

(57) ABSTRACT

A compensation reservoir is provided that includes a connecting socket and a cover having a bottom and a circumferential collar for attachment to the connecting socket, preferably by thread means. The attachment is configured for air interchange between the air of the ambient atmosphere and an inner space of the reservoir which inner space is limited by the bottom. Air interchange is provided by an integrated duct that interconnects a radical outward section of the inner space and an opening within the cover, wherein lateral walls of the duct are casted in one piece from the material of the cover.

7 Claims, 2 Drawing Sheets

COMPENSATION RESERVOIR COMPRISING A RADIAL AIR DUCT ARRANGED IN THE COVER

This application is a U.S. national-phase application of PCT International Application No. PCT/EP01/10510 filed Sep. 12, 2001.

TECHNICAL FIELD

The present invention relates to a compensation reservoir with a cover for a brake system operating with brake fluid. The cover connected to the compensation reservoir must fulfill several tasks. One of its objectives is to prevent brake fluid outside the reservoir from propagating into the ambience of the reservoir since the fluid may lead to disadvantages in the ambience of the reservoir. Another objective is that the closure additionally must be air-permeable in order that the change in volume in the reservoir, which occurs due to fluid loss or temperature change of the fluid, can be compensated by the exchange of air.

BACKGROUND OF THE INVENTION

DE-OS 37 34 421 discloses a cover for a compensation reservoir, the cover being composed of several parts. The screw thread in this cover is so configured that the ambient air can propagate through the windings of the cover's thread into the external inner space of the cover bottom. To prevent brake fluid flowing within the reservoir from being conveyed through the air duct described and into the environment due to the movement of the vehicle, the edge of the connecting socket is hermetically sealed by means of a seal connected to the cover. It is advisable that the air duct gets into connection to the inner space of the reservoir roughly at the level of the axial center axle of the reservoir because the level differences of the moving brake fluid are most insignificant at this point. To this end, the mentioned publication arranges for an air duct that reaches from the radial external inner space of the cover until the center axle of the cover. The air duct can be covered by the inside of the seal or by a special separate cover plate.

BRIEF SUMMARY OF THE INVENTION

Therefore, the present invention is based on a compensation reservoir with a cover which, with its circumferential edge, is adapted to be attached to a connecting socket of the compensation reservoir, preferably by a thread, wherein the connection between the connecting socket and the edge is so configured that air of the ambient atmosphere can propagate through the connection into the radial outwards disposed inner space at the bottom of the cover, and wherein there is provision of a duct interconnecting the radial outwards disposed inner space of the cover and an opening that allows for air to enter between the inner space of the reservoir and the duct. An object of the present invention is to further simplify the cover so that it has an integral design and nevertheless meets the demands placed on it in a satisfying manner.

This object is achieved according to the present invention in that lateral walls of the duct are shaped in one piece from the material of the cover. Thus, the present invention principally involves shaping an air duct that extends in a radial direction into the cover, and the cover may be provided with an integrally formed seal in addition.

In an advantageous aspect of the present invention, there are several favorable possibilities for configuring the air duct. On the one hand, it is possible for the duct to reach from the external edge of the cover in a radial direction until roughly the center axle of the cover, with the duct extending within the material of the cover. A duct of this type may be achieved in the casting process of the cover by inserting a molding pin that is withdrawn from the cover in a radial direction after the casting process. The radial outlet hereby achieved at the outside of the cover edge is closed by an appropriate closing element. However, other types of closure such as hot forming of cast attachments, closings, welding, or cementing the outlet are also conceivable.

Another possibility of shaping the air duct is achieved in that a cylinder opening is provided by a groove that is open in an axial direction and is closed by a closing element. A groove is shaped at the bottom area (preferably externally) and extends from the radial outside chamber up to roughly the center axle of the cover in a radial direction. Because the groove is open to the outside, it must be closed after the casting process. This is done by means of a cover plate that is formed at the cover and adapted to swing by means of a foil hinge. Thus, the open groove to an air duct can be closed by way of turning around the cover plate.

DETAILED DESCRIPTION OF THE PREFERRED EMBODIMENTS

Figure 1:
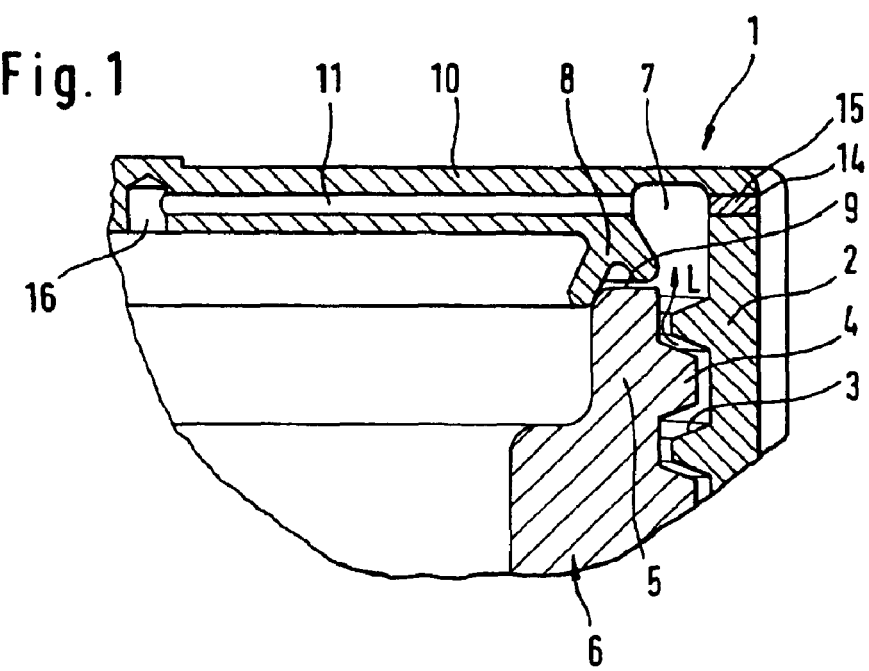
FIG. 1 is a pulled-down sectional view of a cover into which a radial cylinder opening is formed by means of a separate tool.

The cover 1, shown in cross-section and pulled down approximately at the level of the center axle, has inwardly pointing courses of thread 3 at its edge 2. Courses of thread 3 in conjunction with thread 4 at the connecting socket 5 of reservoir 6 shown in a pulled-down fashion are designed so that a per se known air duct is achieved that runs along the courses of thread, as is indicated by the arrow L. Thus, atmospheric pressure can propagate from the ambience of the cover into the radial external inner space 7. A radial circumferential sealing lip 8 that is cast to the cover integrally with cover 1 bears against the top edge 9 of reservoir 6 in a hermetically sealing manner. A radial cylinder opening 11 is provided in the bottom 10 of cover 1 during the casting operation of the cover 1. The cylinder opening 11 intersects the inner space 7 and the edge 2 of the cover. The outlet 14 is closed by a closing element 15. The cylinder opening 11 opens into a cylinder recess 16 having access to the inside space of reservoir 6. This way there is an air duct between the inside space 7 of the cover and the inside space of the reservoir 6 with the duct, as desired, opening into the inside chamber of reservoir 6 approximately at the level of the center axle of the cover 1.

Figure 2:
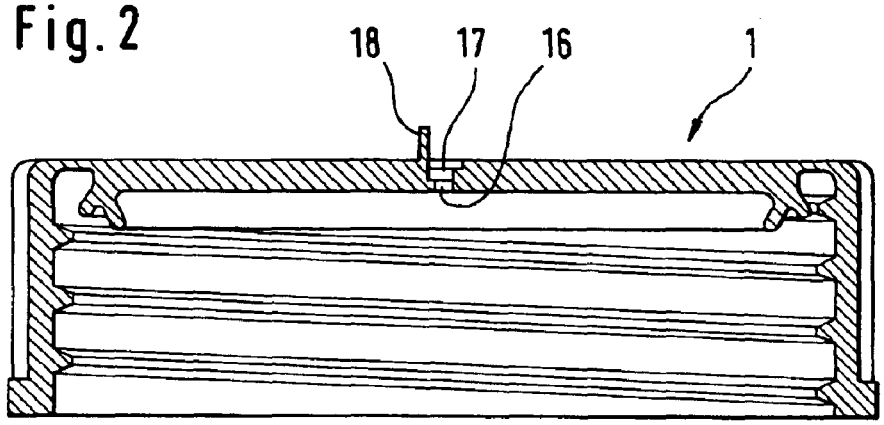
FIG. 2 is a cross-section taken through a cover in which the cylinder opening is formed by an open radial groove that is retroactively closed by means of a cover plate.
Figure 3:
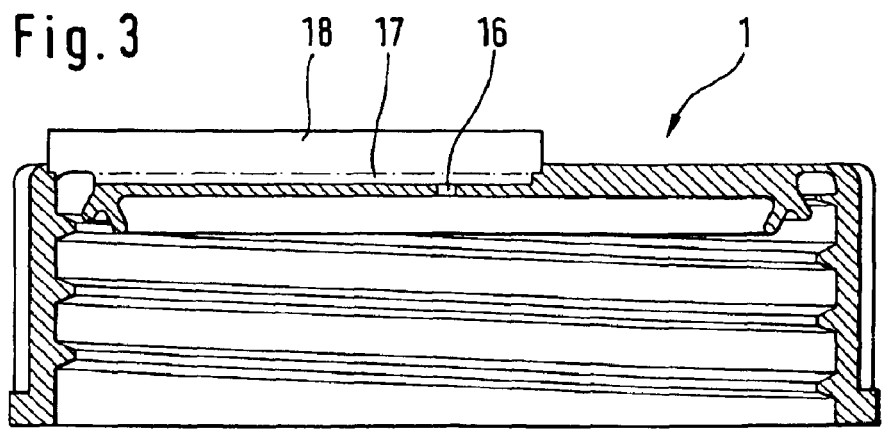
FIG. 3 is a cross-sectional side view of the cover of FIG. 2.

In FIGS. 2 and 3 the cylinder opening is formed by a groove 17 that is open towards the top and adapted to be closed by a closure plate 18. The closure plate 18 is integrally connected to cover 1 by way of a foil hinge and can be swung from the vertical position shown in FIGS. 2 and 3 to a horizontal position in which it closes the open groove 17 and thereby forms a closed cylinder opening that opens into the cylinder recess 16 in a radial inwards position. The stepped groove 17 and the closure plate 18 are shaped such that the open edge of the closure plate 18 can lock with the open groove at its top edge. However, the closure plate 18 can also be closed in any other way according to the invention. This can be done, for example, by way of hot shaping, welding, or cementing an appropriate closure plate that can be shaped at the cover 1 or can be provided separately from the cover 1. In other respects, the cover 1 of FIGS. 2 and 3 can be configured corresponding to the cover 1 of FIG. 1.

Figure 4:
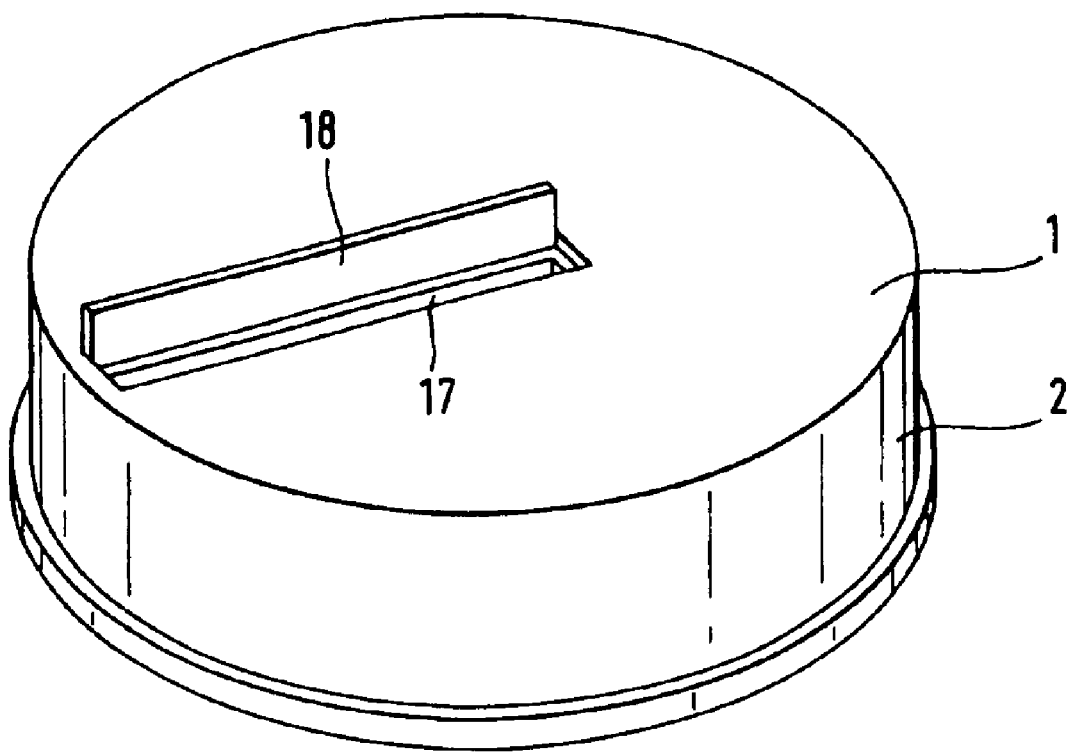
FIG. 4 is a perspective view of the cover of FIGS. 2 and 3, seen transversely from above.

FIG. 4 shows the cover 1 of FIGS. 2 and 3 in a simplified perspective view. Cover 1 with its edge 2 can be seen, with the closure plate 18 projecting vertically from the outside surface of the cover bottom 10. Further, the open groove 17 can be seen in FIG. 4, the groove 17 being reshaped to a closed cylinder opening 11 by way of turning down the closure plate 18.

What is claimed is:

1. Compensation reservoir comprising a connecting socket and a cover having a bottom and a circumferential collar for attachment to the connecting socket by thread means, wherein the attachment is configured for air interchange between the air of the ambient atmosphere and an inner space of the reservoir which inner space is limited by the bottom, and air interchange being provided by an integrated duct that interconnects a radial outward section of the inner space and an opening within the cover, wherein lateral walls of the duct are casted in one piece from the material of the cover, wherein the duct is provided by a cylindrical opening which extends from the radial outward section of the inner space in a radial inward direction and reaches at least until a central axis of the cover, and wherein the cylindrical opening reaches until an outside surface of the circumferential collar, and the outlet of the cylindrical opening is closed by a closing element or by way of hot shaping, welding, or cementing a closing element that is integrally connected to the cover.

2. Compensation reservoir comprising a connecting socket and a cover having a bottom and a circumferential collar for attachment to the connecting socket by thread means, wherein the attachment is configured for air interchange between the air of the ambient atmosphere and an inner space of the reservoir which inner space is limited by the bottom, and air interchange being provided by an integrated duct that interconnects a radial outward section of the inner space and an opening within the cover, wherein lateral walls of the duct are casted in one piece from the material of the cover, wherein the duct is provided by a cylindrical opening which extends from the radial outward section of the inner space in a radial inward direction and reaches at least until a central axis of the cover, and wherein the cylindrical opening is provided by a groove that is open in an axial direction and is closed by a closing element.

3. Compensation reservoir as in claim 2, wherein the closing element is a closure plate that is pivotably cast to the cover by means of a foil hinge in order to open or close the groove.

4. Compensation reservoir as in claim 2, wherein a circumferential sealing lip is cast to the bottom of the cover, said sealing lip rests upon a circumferential edge of the connecting socket of the reservoir.

5. Compensation reservoir and a cover, the reservoir including a connecting socket and the cover including a bottom and a circumferential edge attached to the connecting socket by a thread arrangement configured to provide for air interchange between the ambient atmosphere and an inner space formed between the connecting socket, the circumferential edge and the bottom, a duct extending between the inner space and an opening formed in the cover adjacent the inside of the reservoir, the duct having lateral walls cast in one piece from the material cover, wherein the duct is provided by a groove formed in the outer surface of the bottom and a closing element for closing the open side of the groove.

6. The combination recited in claim 5, wherein the closing element is a closure plate that is pivotally cast to the cover by means of a foil hinge in order to open or close the groove.

7. The combination recited in claim 5, wherein a circumferential sealing lip is cast to the bottom, said sealing lip rests upon a circumferential edge of the connecting socket of the reservoir.

* * * * *